United States Patent [19]
Nakajima et al.

[11] Patent Number: 5,754,728
[45] Date of Patent: May 19, 1998

[54] FAST VIDEO BROWSING SYSTEM

[75] Inventors: Yasuyuki Nakajima, Saitama; Hironao Hori, Tokyo; Tamotsu Kanoh, Saitama; Kiyono Ujihara, Tokyo, all of Japan

[73] Assignee: Kokusai Denshin Denwa Kabushiki Kaisha, Tokyo, Japan

[21] Appl. No.: 691,355

[22] Filed: Aug. 2, 1996

[30]     Foreign Application Priority Data

Aug. 11, 1995   [JP]   Japan ................................. 7-226020

[51] Int. Cl.$^6$ ............................. H04N 5/91; H04N 5/917
[52] U.S. Cl. ................................ 386/68; 386/110
[58] Field of Search ........................... 348/699, 700, 348/701, 416, 402; 386/68, 67, 5, 6, 7, 110; 360/32; H04N 5/91, 5/917

[56]        References Cited

U.S. PATENT DOCUMENTS 5,253,054  10/1993  Fujiwara et al. ............ 348/699
5,561,476  10/1996  Kershaw et al. ............ 348/699

FOREIGN PATENT DOCUMENTS 1068084  3/1989  Japan .

OTHER PUBLICATIONS

Japanese language portion and English translation of pertinent portion of "A video browsing method using high speed objects detection", General Assembly of Electronics Information and Communication Institute, (Japan) D–396, 1995.

Primary Examiner—Robert Chevalier
Attorney, Agent, or Firm—Westman, Champlin & Kelly, P.A.

[57]         ABSTRACT

To provide a fast video browsing system in which a fast playback suitable for keeping track of the contents can be performed by adaptively determining the number of skipped pictures according to the motion vector of picture, and displaying the picture after the skipped pictures. In step S1, pictures to be fast viewed are sequentially inputted, and in step S2, n pictures are skipped. In step S3, the picture after the n skipped pictures is displayed. In step S4, using the picture before or after the displayed picture with respect to time, a motion vector at one frame interval is detected, and in step S5, the number n of skipped pictures is determined from the motion vector. As a result, the number of skipped pictures can be adaptively determined by the motion vector of a picture.

16 Claims, 9 Drawing Sheets

(PICTURE i)

FIG. 12B

(PICTURE p)

FIG. 13A (PICTURE i)

FIG. 13B (PICTURE p)

FIG. 16A  INPUT FRAMES
G=14

FIG. 16B  FAST PLAYBACK FRAMES

EXAMPLE OF FAST PLAYBACK

FIG. 18C PRIOR ART

# FAST VIDEO BROWSING SYSTEM

BACKGROUND OF THE INVENTION

1. Field of the Invention

The present invention is related to a fast video browsing system, and particularly to a fast video browsing system which can keep track of the contents of motion pictures at fast speed in a system for reading, transmitting and displaying digital motion pictures.

2. Description of the Related Art

Figure 17:
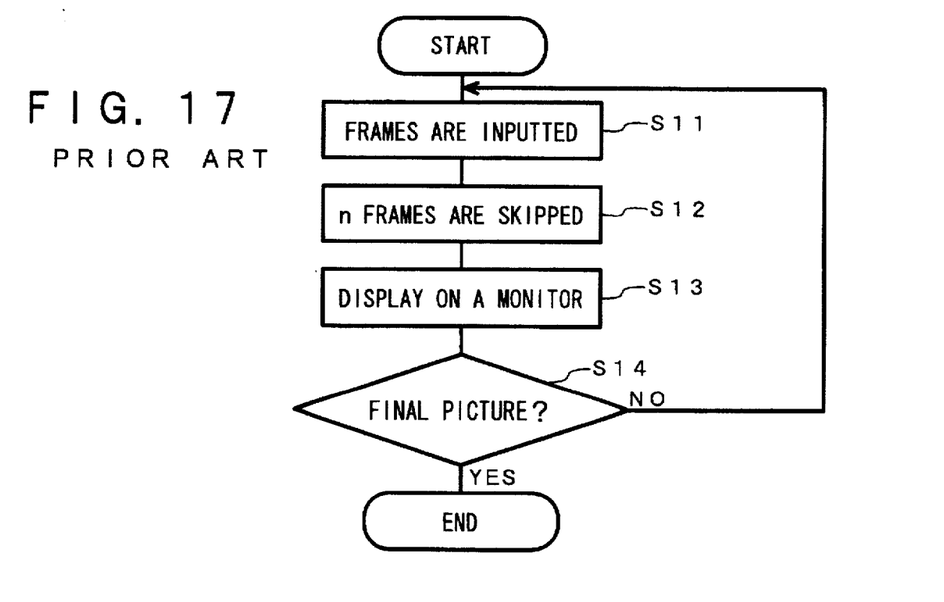
FIG. 17 is a flowchart for explaining the operation of the conventional fast playback.
Figure 18A:
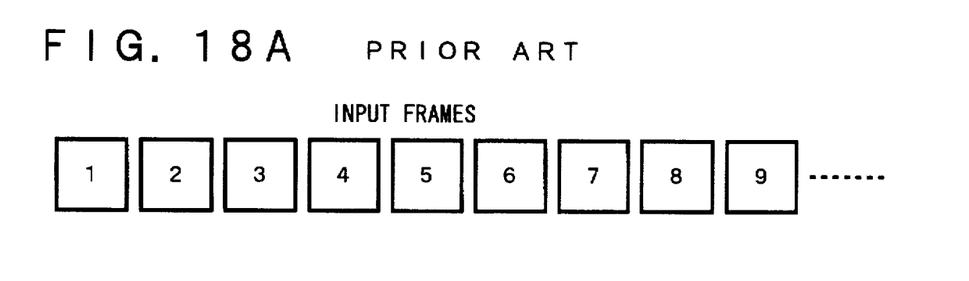
FIGS. 18A, 18B and 18C are explanatory views for an example of the conventional first fast replayed frame display.
Figure 18B:
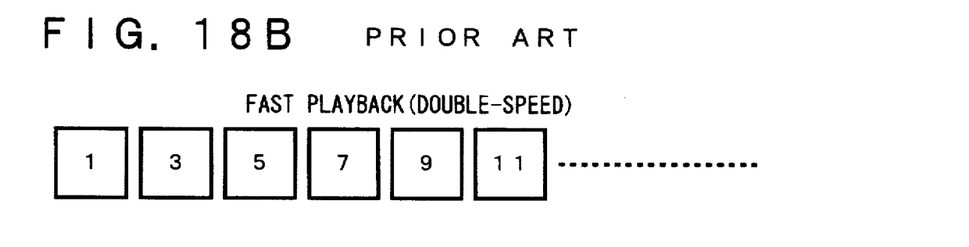

As to the conventional fast video playback, by skipping and displaying pictures at a fixed interval as shown in FIG. 18B by a process as shown in FIG. 17, the playback is performed at a speed m times the normal playback.

In step S11 in FIG. 17, frames 1, 2, 3, . . . as in FIG. 18A are inputted. In step S12, the number of skipped pictures is determined according to the speed of fast playback. For instance, for double-speed, one picture is skipped as shown in FIG. 18B. In step S13, the pictures which are not skipped are displayed on a display. In step S14, it is determined whether the input frame has reached the final picture, and if this determination is negative, the process returns to step S11 to continue the inputting of pictures. Further, as to the skip in the above step S12, it is also possible that four pictures are skipped and the pictures which are not skipped are displayed twice in a row.

The examples of the equipment for replaying motion pictures at fast speed include laser disk, video CD, etc. In a laser disk, the disk is browsed through and pictures are displayed at an interval to achieve fast playback. Also, for digitally compressed pictures such as in a video CD, only intra coded pictures existing at every 15 frames are skip-read to achieve a fast replay.

Further, a method for detecting a moving object to determine the playback speed is proposed ("A Method for Preparing Fast-Viewed Pictures Using the Detection of a Fast Moving Object", General Assembly of Electronic Information Communication Institute, D-396, 1995). In this method, as shown in FIGS. 19A and 19B, a fast moving object is detected once for some frame sections (in the example in the figure, 3 frames), and the playback is performed slower than a V-times speed if there is the fast moving object, faster than the V-times speed if there is no moving object and similar pictures continue, and at the V-times speed for other cases (for instance, there is a medium- or low-speed moving object).

Figure 18C:
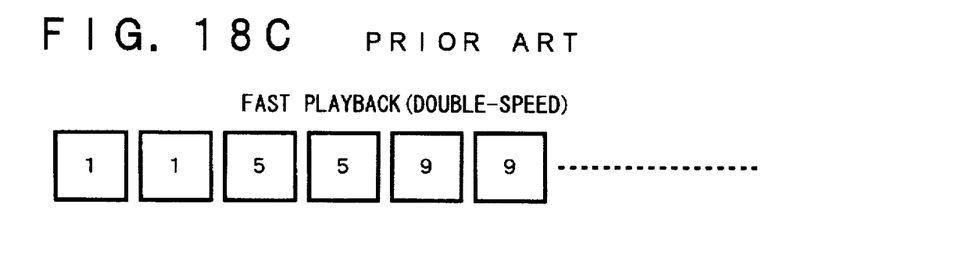

In the above described first fast playback, as apparent from FIGS. 18B or 18C, pictures are skipped and displayed at a fixed interval, and thus, if the original pictures move intensively, the movement becomes so intense that it is difficult to keep track of the contents of the pictures or search for a desired scene. On the other hand, for pictures which are slowly moving, the movement of the pictures is also slow in a fast playback, and thus there is a problem that the playback speed is too slow and there is a feeling of redundancy.

Figure 19A:
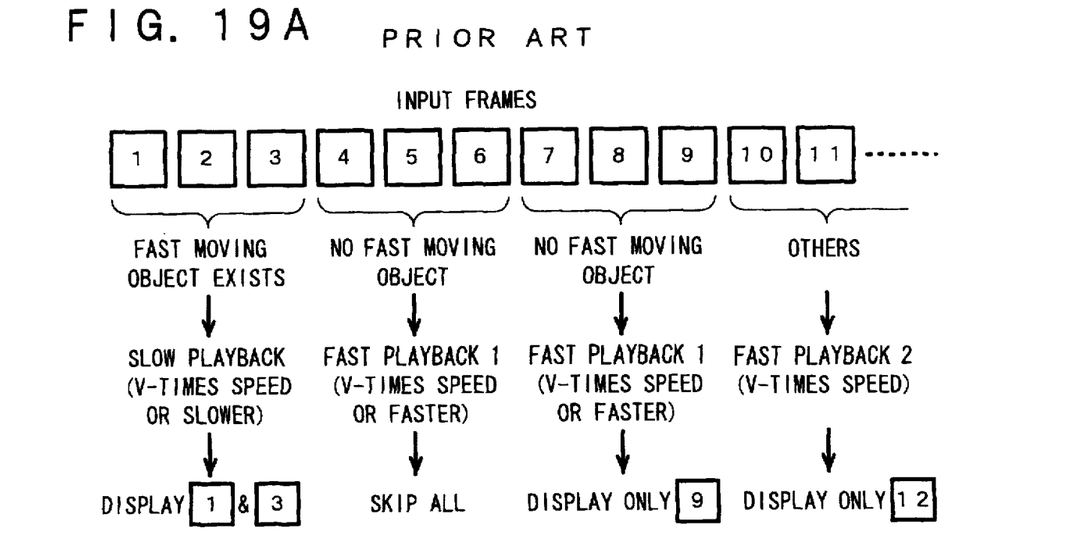
FIGS. 19A and 19B are explanatory views for an example of the conventional second fast replayed frame display.
Figure 19B:
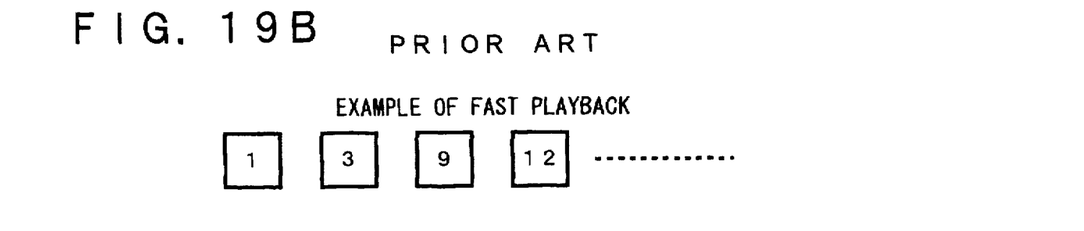

Further, in the above described conventional second fast playback, as obvious from FIGS. 19A and 19B, since three speeds (speed slower than V-times speed, V-times speed, and speed faster than V-times speed) are basically used in response to the existence of a moving object, the adaptability to movement is not sufficient. Moreover, since the playback speed for a certain frame section is determined after traversing through frame sections, there is a problem that a large amount of memory is required to replay pictures. In addition, for compressed moving picture data, since it is needed to once restore the pictures by a decoding process, the process before deciding the playback speed becomes too large and thus a fast playback is difficult.

SUMMARY OF THE INVENTION

It is the object of the present invention to eliminate the abovementioned problems of the conventional prior art, and provide a fast video browsing system in which a fast playback appropriate for keeping track of the contents can be performed by adaptively determining the number of skipped pictures according to the motion vector of pictures, and displaying the picture after the skipped pictures.

To solve the above problem, the present invention is a fast video browsing system for keeping track of the contents of motion pictures, characterized by comprising a means for detecting the motion vector of pictures, a means for determining the number of skipped pictures according to the motion vector, and a means for displaying the picture after the skipped pictures. Further, the present invention is characterized by comprising a means for extraction of motion vector information from coded video information, a means for determining the motion vector of pictures using the extracted motion vector information, a means for determining the number of skipped vectors according to the motion vector, and a means for decoding and displaying the picture after the skipped pictures.

In accordance with the present invention, since the playback speed of pictures is determined by the motion vector of pictures, the number of skipped pictures can be made smaller when the motion vector is larger, and conversely, when the motion vector of pictures is smaller, the number of skipped pictures can be made larger. Thus, even if a user playbacks motion pictures at fast speed, the contents of them can be naturally grasped without a sense of incongruity.

DETAILED DESCRIPTION OF THE PREFERRED EMBODIMENT

Now, the present invention is described in detail with reference to the drawing. First, the principle of the present invention is described with reference to the flowchart of FIG. 1.

Figure 1:
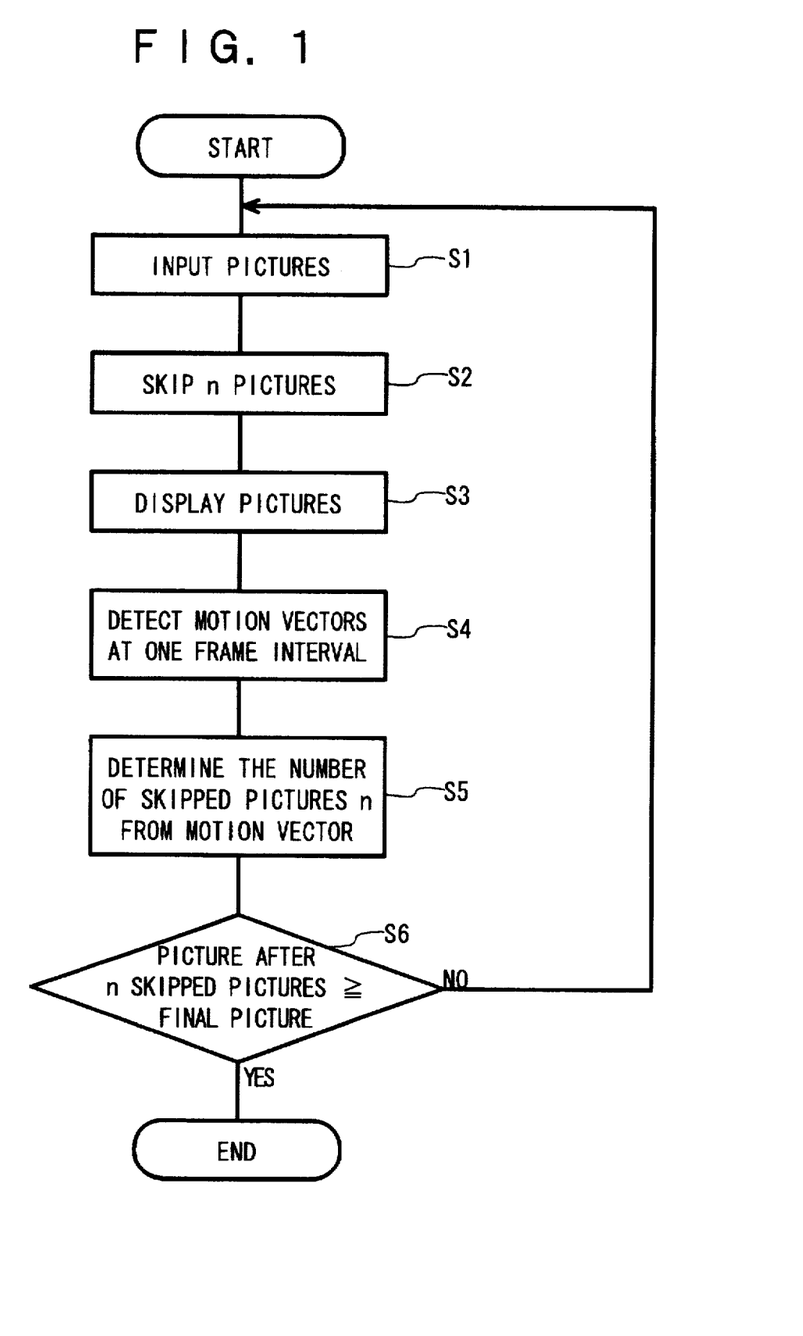
FIG. 1 is a flowchart for explaining the principle of the fast browsing of the present invention.

In step S1, pictures to be fast viewed are inputted at high speed from, for instance, a laser disk, video CD or the like. In step S2, input pictures are skipped by the number n of skipped pictures determined in step S5 to be described later. In step S3, the skipped pictures are displayed on a display, not shown. In step S4, by the above incoming pictures, the motion vector at one frame interval is detected. In step S5, using the detected motion vector, the number n of skipped pictures is determined. Then, in step S6, it is determined whether the picture after n skipped pictures equals to the final picture or has exceeded this, and if the determination is negative, the process goes to step S1 to continue the inputting of pictures.

As described above, the present invention is characterized in that a motion vector is detected from input pictures, and the number n of skipped pictures is arbitrarily determined from the detected motion vector.

Figure 2:
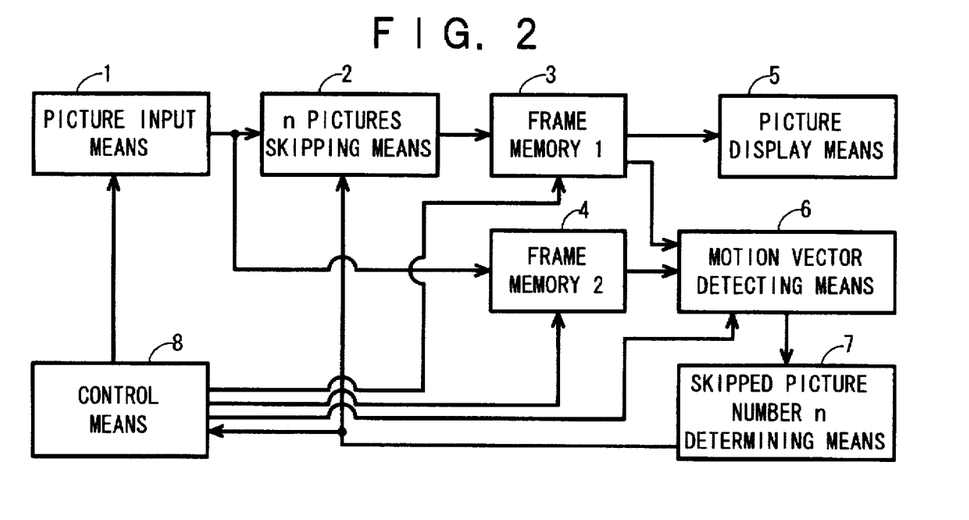
FIG. 2 is a block diagram showing the first embodiment of the present invention.
Figure 3:
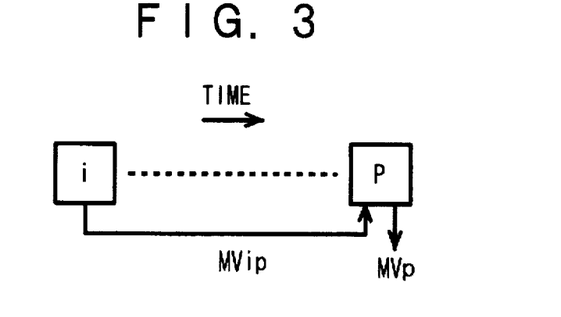
FIG. 3 is an explanatory view for an example of the motion vector extraction of the first embodiment.

The embodiments of the present invention are described below. FIG. 2 is a functional block diagram of the first embodiment of the present invention. In the figure, continuous pictures are inputted from a picture input means 1. A n pictures skipping means 2 skips the input pictures according to the number n of skipped pictures determined in a skipped picture number n determining means 7. As the first number of skipped pictures, for instance, n=1 is set. A first frame memory 3 stores the picture after n skipped pictures, and a picture display means 5 displays the picture stored in the first frame memory 3. A control means 8 uses the number n of skipped pictures determined in a means for determining the number n means 7 to cause a second memory 4 to store a picture several frames before the picture stored in the first frame memory 3. For instance, as shown in FIG. 3, if the picture after n skipped pictures which is stored in the first frame memory 3 is the p-th frame, the picture of the i-th frame which is (p-i) frames before the p-th frame is stored in the second frame memory 4. (p-i) is a predetermined constant value. This control may be carried out in the control means 8 as described above, or a delay means for delaying (p-i) frames may be provided in the preceding stage of the second frame memory 4. Further, the picture previously stored in the first frame memory 3 may be transferred to and stored in the second frame memory 4 without providing the delay means.

A motion vector detecting means 6 uses the following expression to calculate a motion vector MVp at one frame interval from the pictures stored in the first frame memory 3 and the second frame memory 4.

$$MVp = MVip/(p-1) \tag{1}$$

In the expression, MVip is the motion vector from a picture i positioned in the past with respect to time to a picture p, and how to calculate it is described later in detail.

Then, the skipped picture number n determining means 7 decides the number n of skipped pictures required for fast browsing according to motion vector obtained in the motion vector detecting means 6. The human visual system is characterized by tracing a moving object by dynamic visual acuity, and as described, for instance, in "Compression of Picture Information," Ohm-sha (supervised by Harajima, 1991), the visual acuity decreases as the speed of the moving object increases. Accordingly, by decreasing the number of skipped pictures if the movement of pictures is larger, and conversely, by increasing the number of skipped pictures if the movement of pictures is smaller, the overall picture movement is made constant, and a browsing playback suitable for keeping track of the contents can be carried out. As the method for determining the number of skipped pictures adaptively to the movement, the number of skipped pictures can be obtained by making the motion vector for the skipped pictures be a fixed value as in the following expression (2).

$$n \times |MVp| = \alpha \tag{2}$$

In the above expression, n is the number of skipped pictures. Further, α is a constant which is a parameter for determining the movement of pictures replayed at fast speed, and it can be determined according to the playback speed.

Figure 4A:
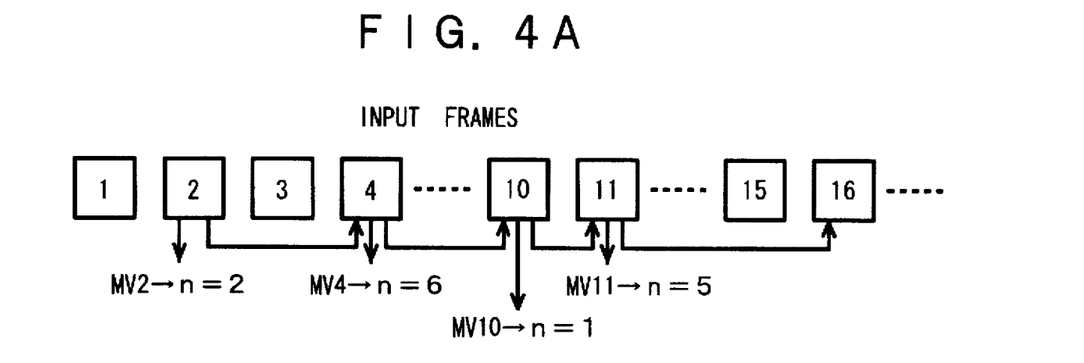
FIGS. 4A and 4B are explanatory views for an example of the display of fast replayed frames of the first embodiment.
Figure 4B:
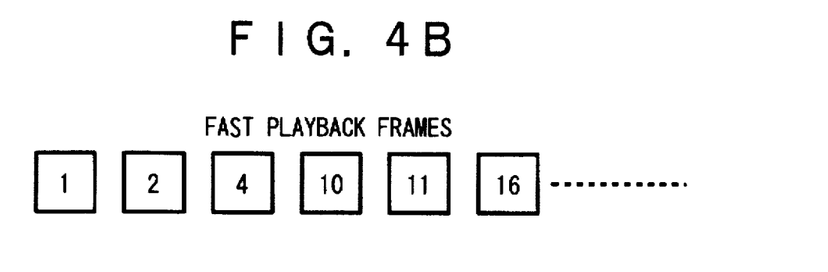

If α is set to a large value, a very fast playback is provided as a whole, and conversely, if it is set to a small value, a slow playback is provided as a whole. If, in the expression (2), |MVp| is very small or 0, a fixed value such as 15 frames can be used as n. FIG. 4A shows an example of input frames and the number n of skipped pictures calculated according to the expression (2), and FIG. 4B shows an example of the fast replayed frames by the number n of skipped pictures. This figure shows that the number n of skipped pictures varies adaptively to the speed of the movement of pictures.

Now, the second embodiment of the present invention is described with reference to FIGS. 5 and 6. As obvious from FIG. 5, this embodiment is characterized in that the motion vector MVsp is calculated from a picture s which is in the future by (s-p) frames with respect to time from a displayed picture p and the displayed picture p. Incidentally, the symbols in FIG. 5 which are the same as FIG. 2 represent the portions same as or identical to those in FIG. 2.

Figure 5:
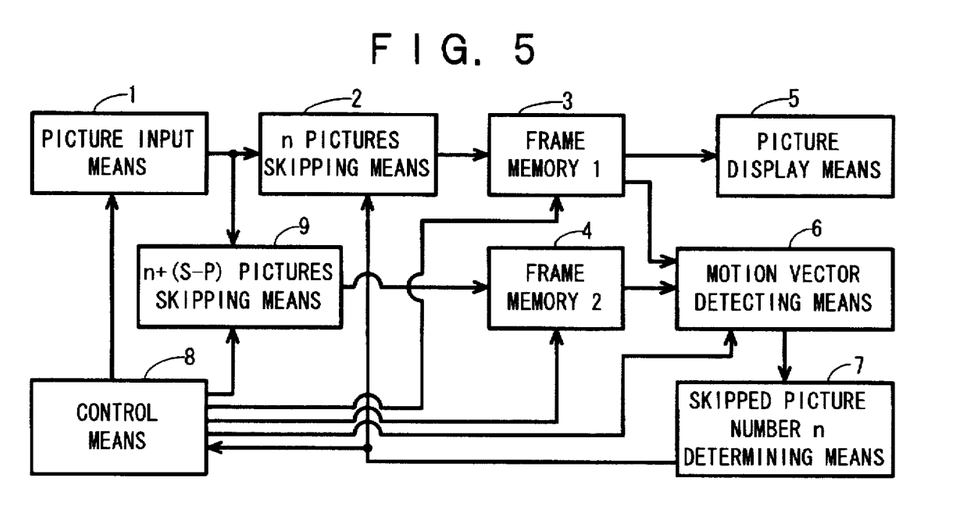
FIG. 5 is a block diagram showing the second embodiment of the present invention.
Figure 6:
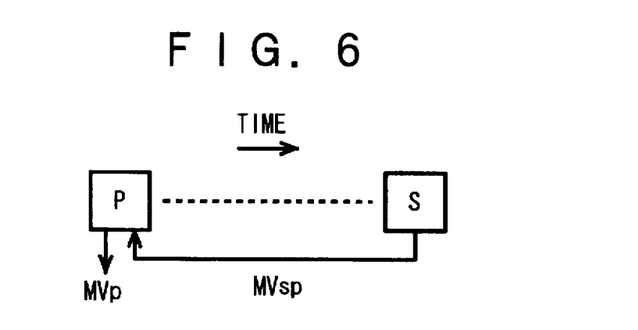
FIG. 6 is an explanatory view for an example of the motion vector extraction of the second embodiment.

In FIG. 5, the pictures inputted from a picture input means 1 are entered to a n pictures skipping means 2. The picture p after n pictures skipped in the n pictures skipping means 2 is stored in a first frame memory 3, and displayed on a picture display means 5. On the other hand, in a second frame memory 4, a picture s which is skipped by n+(s-p) pictures in a n+(s-p) pictures skipping means 9 and which is in the future by (s-p) frames with respect to time from the picture p is stored by the control by a control means 8. Subsequently, a motion vector detecting means 6 uses the pictures stored in the first and second frame memories to calculate a motion vector MVp at one frame interval by the following expression (3).

$$MVp = -MVsp/(s-p) \tag{3}$$

When the motion vector MVp is obtained as described above, a skipped picture number n determining means 7 calculates the next number n of skipped pictures using the expression (2), as in the above described first embodiment. The number n of skipped pictures obtained by the skipped picture number n determining means 7 is sent to a control means 8 and a n pictures skipping means 2. The control means 8 selects the next picture stored in the second frame memory 4 according to the number n of skipped pictures. This control may be carried out in the control means 8 as described above, or a delay means for delaying (s-p) frames may be provided in the previous stage of the n pictures skipping means 2.

In accordance with this embodiment, the number of pictures adaptive to the motion vector of pictures can be skipped, as in the first embodiment, and thus a fast playback suitable for keeping track of the contents can be performed.

The third embodiment of the present invention is now described with reference to FIGS. 7 and 8. As apparent from FIG. 8, this embodiment is characterized in that a motion vector MVp is calculated from a picture i which is (p-i) frames before a picture display frame p with respect to time, a picture s which is in the future by (s-p) frames with respect to time, and the picture display frame p. Incidentally, the symbols in FIG. 7 which are the same as FIG. 2 represent the portions same as or identical to those in FIG. 2.

Figure 7:
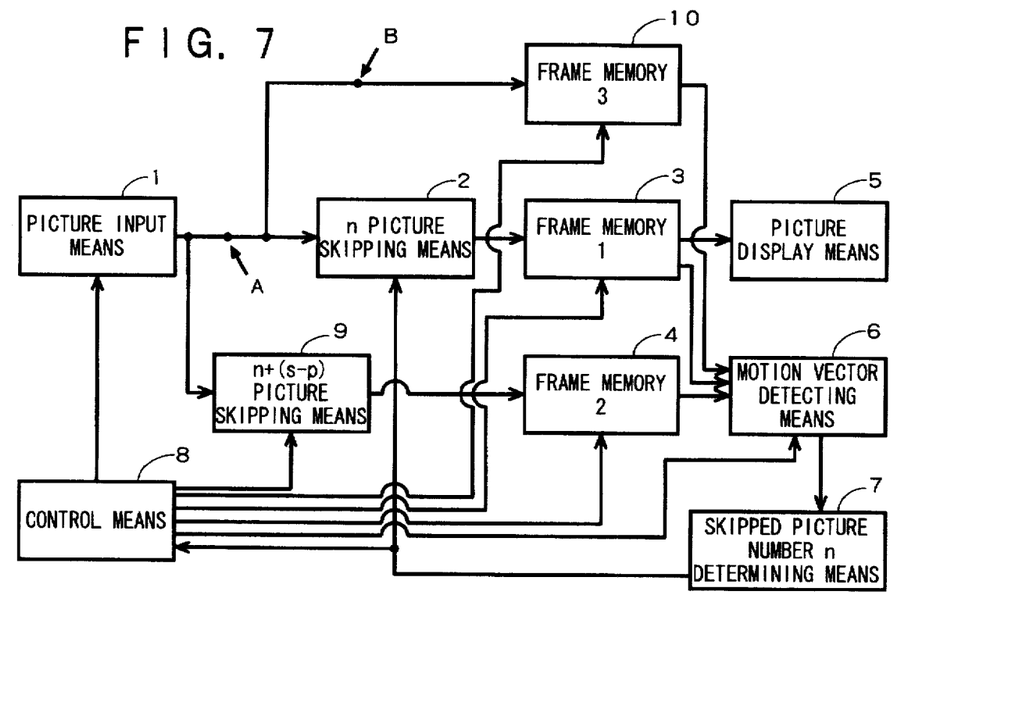
FIG. 7 is a block diagram showing the third embodiment of the present invention.
Figure 8:
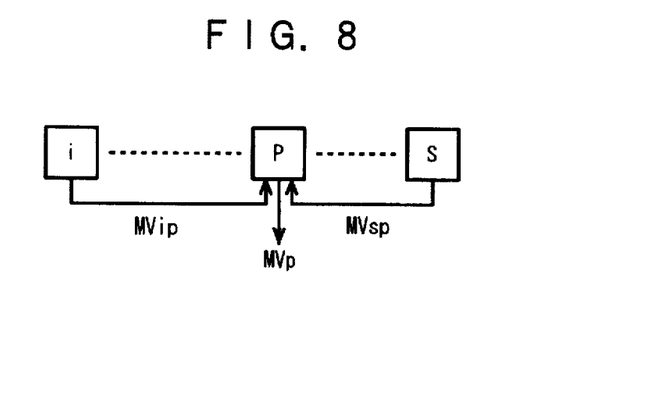
FIG. 8 is an explanatory view for an example of the motion vector extraction of the third embodiment.

In FIG. 7, the pictures inputted from a picture input means 1 are entered to a n pictures skipping means 2. And, the picture p after n skipped pictures is stored in a first frame memory 3. Further, the picture s which is skipped by n+(s-p) pictures in a n+(s-p) pictures skipping means 9 and which is in the future by (s-p) frames from the picture p with respect to time is stored in a second frame memory 4. Moreover, in a third frame memory 10, the picture 1 which is (p-i) frames before the picture p is stored. The control of these frame memories is carried out by a control means 8. A motion vector detecting means 6 uses the pictures stored in the above described first to third frame memories 3, 4 and 10 to calculate an average motion vector MVp at one frame interval by the following expression (4).

$$MVp = \tfrac{1}{2} \cdot |MVip/(p-i) - MVsp/(s-p)| \qquad (4)$$

Since the succeeding operation is similar to the first and second embodiments, the description thereof is omitted. This control may be carried out in the control means 8 as described above, or it may be possible that a first delay means for delaying (s-p) frames is provided at the position A in FIG. 7 and a delay means for delaying (p-i) frames is provided at the position B. Also in this embodiment, an effect similar to the above first and second embodiments can be obtained.

Now, the fourth embodiment of the present invention is described with reference to FIGS. 9 and 10. Since motion pictures generally have a continuous movement, the movement of the whole pictures can be detected with high precision without being affected by sporadic movements by obtaining the motion vector MVp of an input picture p from a plurality of pictures positioned before or after it with respect to time. FIG. 10 shows the operation for obtaining an average motion vector MVp at one frame interval using the motion vectors MVip, MVjp and MVkp from three pictures i, j and k positioned before with respect to time to a picture p. Incidentally, the symbols in FIG. 9 which are the same as FIG. 2 represent the portions same as or identical to those in FIG. 2.

Figure 9:
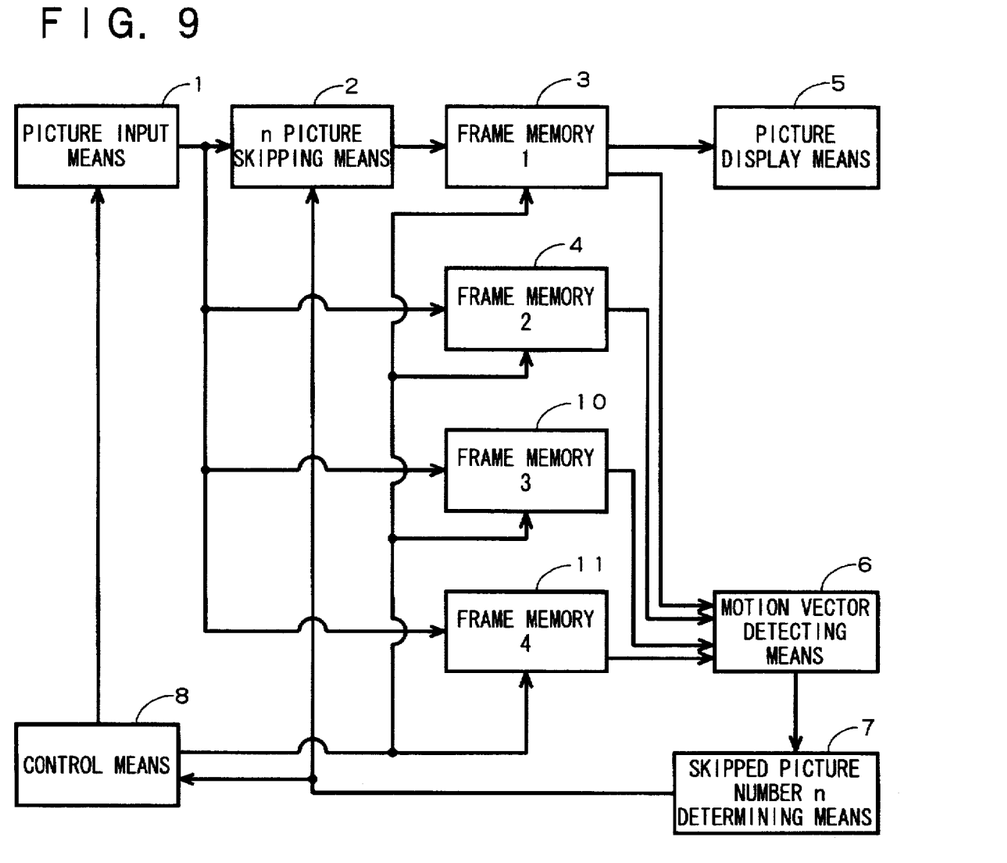
FIG. 9 is a block diagram showing the fourth embodiment of the present invention.
Figure 10:
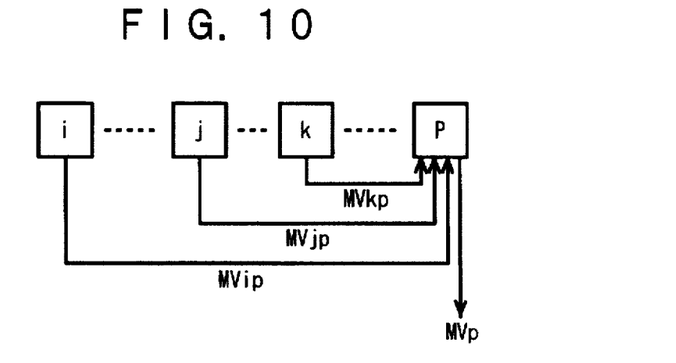
FIG. 10 is an explanatory view for an example of the motion vector extraction of the fourth embodiment.

The first to fourth memories 3, 4, 10 and 11 in FIG. 9 are to store the pictures p, k, j and i, respectively, by control of a control means 8. A motion vector detecting means 6 calculates an average motion vector MVp at one frame interval from the following expression (5).

$$MVp = \tfrac{1}{3} \cdot \{MVip/(p-i) + MVjp/(p-j) + MVkp/(p-k)\} \qquad (5)$$

Since the subsequent operation is the same as each embodiment described above, the description thereof is omitted.

In accordance with this embodiment, the detection is performed with high precision without being affected by sporadic movements. Although, in this embodiment, three pictures were employed as pictures which are in the past from the picture p with respect to time, the present invention is not limited to this, but four or more pictures may be used.

Figure 11:
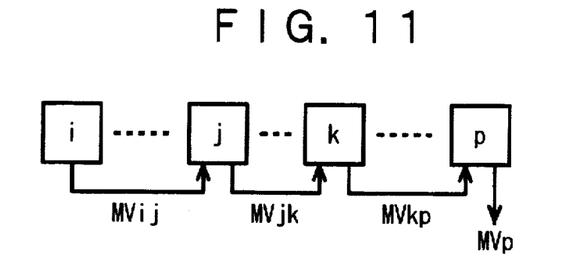
FIG. 11 is an explanatory view for an example of the motion vector extraction of a variation of the fourth embodiment.

A variation of the fourth embodiment of the present invention is now described with reference to FIG. 11. In this variation, using the motion vectors between three pictures k, j and i positioned before with respect to time from a picture p to be displayed, an average motion vector MVp at one frame interval is calculated from the following expression (6).

$$MVp = \tfrac{1}{3} \cdot \{MVij/(j-i) + MVjk/(k-j) + MVkp/(p-k)\} \qquad (6)$$

Specifically, it can be accomplished by carrying out the calculation of the expression (6) in the motion vector detecting means 6 in FIG. 9.

Description is now made to how to obtain the motion vector MVip between the two pictures i and p, which was used in each embodiment described above.

Figure 12A:
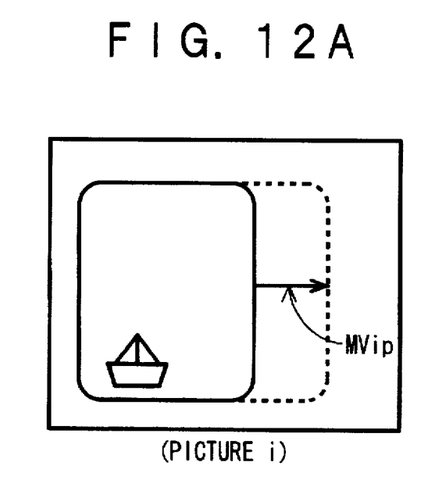
FIGS. 12A and 12B are explanatory views for the first method for calculating the motion vector MVip of pictures.
Figure 12B:
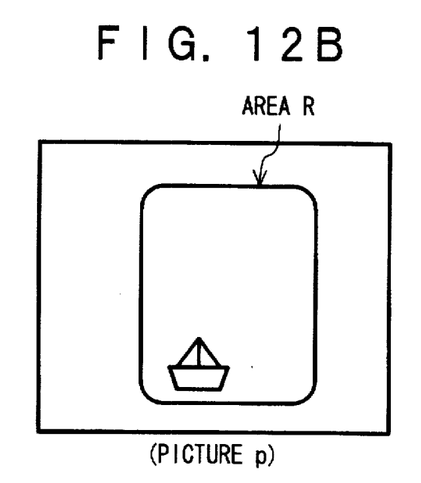

FIGS. 12A and 12B show the first method in which by obtaining the position of an area in the picture i, which area matches an area R existing in the picture p, the motion vector MVip of the pictures are obtained. To search for the matching area, first, as in the following expression (7), the sum S (vx, vy) of absolute pixel difference between the pictures i and p of the pixel data in the certain area R is calculated.

$$S(vx, vy) = \sum_{x,y \in R}^{vx,vy} |p(x,y) - i(x + vx, y + vy)| \qquad (7)$$

Now, the position (vx', vy') at which the S (vx, xy) is minimum is searched, and this position (vx', vy') is assumed to be the motion vector MVip of the pictures.

Figure 13A:
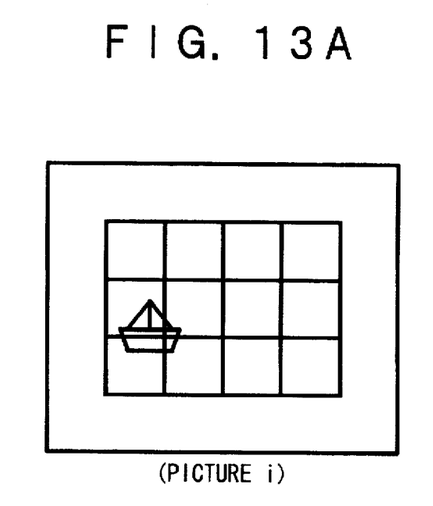
FIGS. 13A and 13B are explanatory views for the second method for calculating the motion vector MVip of pictures.
Figure 13B:
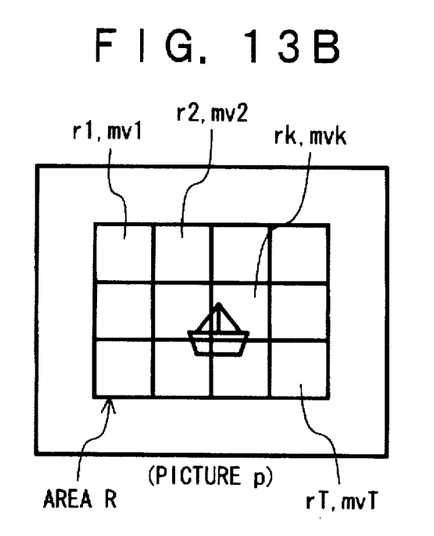

FIGS. 13A and 13B show the second method in which a certain area R in the picture p is divided into a plurality of small areas r, and the motion vectors mvk related to the individual small areas r are used to obtain the motion vector MVip of the pictures.

First, the sum Sk(vx, vy) of absolute pixel difference in a certain small area rk (k=1, 2, 3, . . . , T, where T is the total number of the small areas in the picture) is calculated by the following expression (8).

$$Sk(vx, vy) = \sum_{x,y \in rk}^{vx,vy} |p(x,y) - i(x + vx, y + vy)| \qquad (8)$$

And, the position (vx', vy'), at which the sum Sk(vx, vy) of the differential values between the pictures i and p of the pixel data in the small area rk shown in the expression (8), is assumed to be the motion vector mVk related to the small area r. Then, the motion vector MVip of the picture p can be calculated as an average of the motion vectors mVk in the individual small areas, as in the following expression (9).

$$MVip = 1/T \cdot \sum_{k=1}^{T} mVk \qquad (9)$$

Here, one of the following expressions (10)–(12) may be used for norm |MVp| of motion vector.

$$|MVip| = 1/T \cdot \sum_{k=1}^{T} |mVk| = 1/T \cdot \sum_{k=1}^{T} \sqrt{vxk^2 + vyk^2} \qquad (10)$$

$$|MVip| = \left| 1/T \cdot \sum_{k=1}^{T} mVk \right| = \sqrt{\left(1/T \cdot \sum_{k=1}^{T} vxk\right)^2 + \left(1/T \cdot \sum_{k=1}^{T} vyk\right)^2} \qquad (11)$$

$$\left. \begin{array}{l} |MVip| = vj \\ H(vj) = \max(H(v1), H(v2), \ldots, H(vw)) \end{array} \right\} \qquad (12)$$

The expression (10) is to calculate a picture average of the norms of the motion vectors of the respective small areas, and if, for instance, there are many random movements in the picture, the motion vector becomes large. On the other hand, the expression (11) is a method for calculating the average movements in the respective directions of the X- and Y-axes to obtain the norm of the average motion vector, and the motion vector becomes large for a movement in one direction such as the camera pan, but the movements in the picture are canceled for random movements and the average motion vector becomes a small value. The expression (12) is a method for obtaining the motion by the majority rule, and the range of the values of the motion vectors obtained in the respective small areas is divided by w, the distribution of the norms is examined, and the motion vector showing the maximum distribution is deemed to be the motion of the picture. For instance, if the obtained motion vectors ranges from 0 to 20 and W=10, H(2), H(4), H(6) . . . , H(20) are obtained, and the motion vector having the maximum frequency becomes the motion of the picture.

Figure 14:
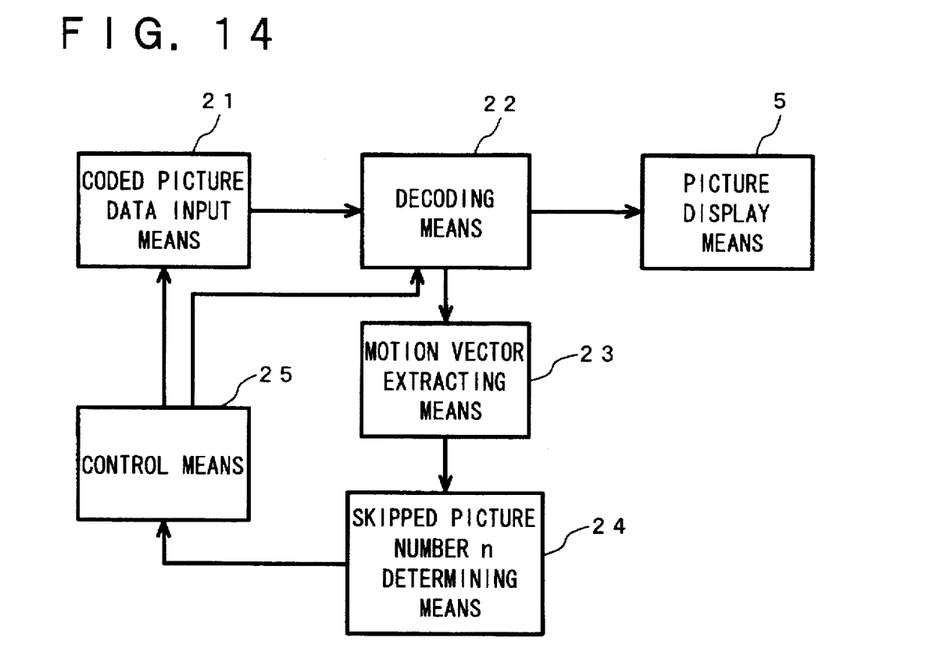
FIG. 14 is a block diagram showing the fifth embodiment of the present invention.

The fifth embodiment of the present invention is described below with reference to FIG. 14. This embodiment is characterized in that the motion picture data to be inputted is compressed data. Although this embodiment can be applied to any motion picture coding algorithm, description is made here to the motion picture coding by the MPEG method.

Coded picture data is inputted from a coded picture data input means 21. A decoding means 22 decodes the inputted coded picture data. The motion vector in the decoded data is extracted in a motion vector extracting means 23. On the other hand, the decoded picture data is displayed on a picture display means 5. A skipped picture number n determining means 24 determines the number n of skipped pictures according to the expression (2) from the motion vector extracted by the motion vector extracting means 23. When a control means 25 receives the number n of skipped pictures, it gives control to the decoding means 22 for the pictures to be decoded and displayed.

For instance, in the MPEG method, motion vector information is decoded in the variable-length decoding process in the decoding process, and thus the motion vector extracting means 23 corresponds to the variable-length decoding process in the decoding process. However, since the motion vector is obtained for each small block, the movement of pictures can be obtained by using the expressions (8) and (9). Further, since the motion vector takes the forms of FIGS. 3, 6 and 8 depending on coded pictures, the expressions (1), (3) and (4) can be used.

For a picture such as an intra coded picture in which no motion vector exists, the motion vector obtained when decoding the pictures before and after that picture can be substituted. Further, if an area coded using a motion vector and an area coded without using a motion vector coexist in a picture, the motion vector in the area coded using the motion vector can be substituted.

Further, if the pictures specified by the number n of skipped pictures need to be decoded using the pictures positioned before and after them, as in, for instance, the B-pictures of MPEG, it is needed to decode the pictures before and after first, and thus the processing time can increase. Accordingly, by using the pictures positioned before and after as substitutes, the processing time can be shortened.

Since the number n of skipped pictures is also determined on the basis of the motion vector in this embodiment, an effect similar to each embodiment described above can be obtained. Further, since the motion vector detecting means 6 in each embodiment described above is obviated, the operation speed can be made faster and the construction of the system can be simplified.

Figure 15:
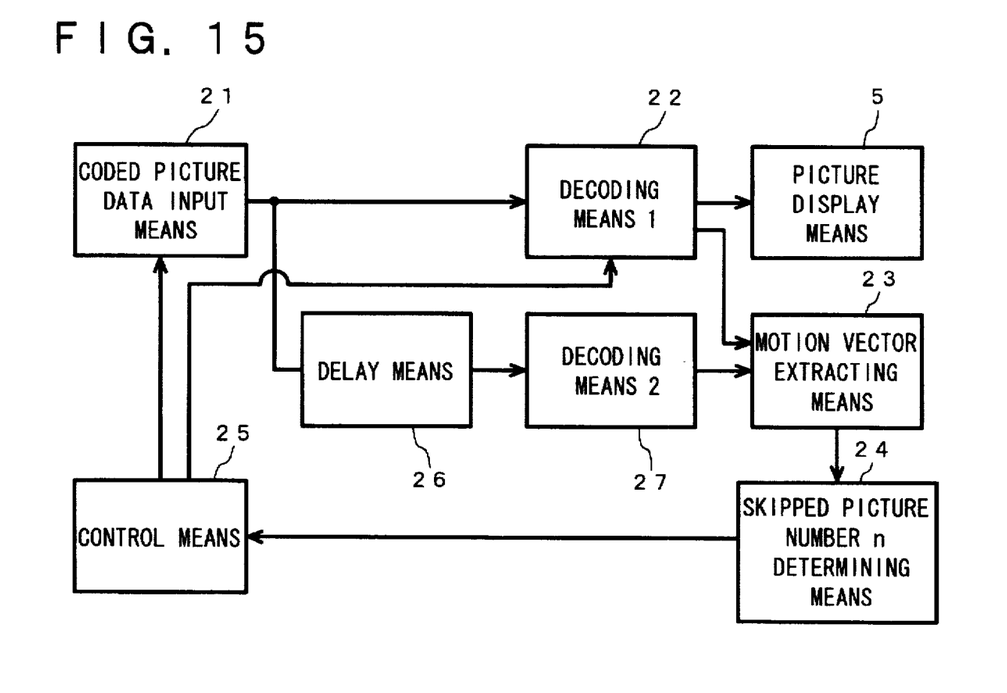
FIG. 15 is a block diagram showing the sixth embodiment of the present invention.

The sixth embodiment of the present invention is now described with reference to FIG. 15. The symbols in FIG. 15 which are the same as FIG. 14 represent the portions same as or identical to those in FIG. 14. This embodiment is characterized in that the motion vectors of past pictures are also used to determine the skipped pictures n. In a first decoding means 22, the currently displayed coded picture data is decoded, and in a second decoding means 27, the past coded picture data delayed by delay means 26 is decoded. A motion vector extracting means 23 extracts the two motion vectors obtained by the above decoding, and determines the motion vector from these. A skipped picture number n determining means 24 uses the above described expression (2) to determine the number n of skipped pictures. Upon receipt of the number n of skipped pictures, a control means 25 controls the decoding means 22 for the picture to be decoded and displayed. Although the motion pictures of past pictures are also used in this embodiment, the present invention is not limited to this, but the motion vectors of future pictures with respect to time or the motion vectors of both past and future pictures may be used.

Figure 16A:
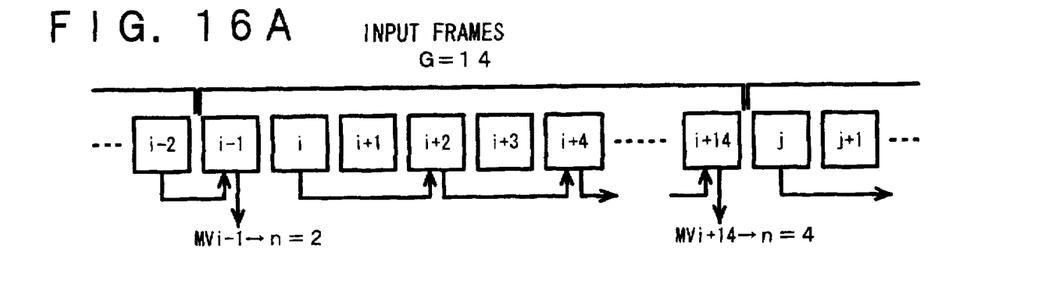
FIGS. 16A and 16B are explanatory views for an example of the fast replayed frame display of the seventh embodiment of the present invention.
Figure 16B:
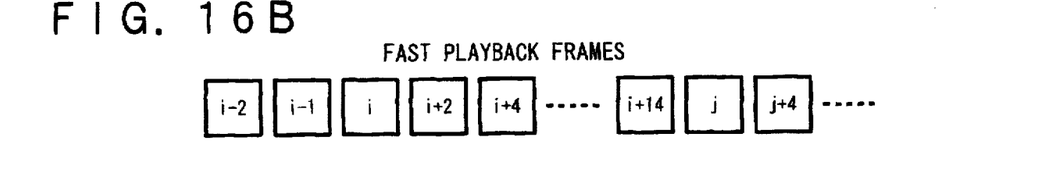

The seventh embodiment of the present invention is described below with respect to FIGS. 16A and 16B. This embodiment is characterized in that the number n of skipped pictures is updated at a picture interval G in the skipped picture number n determining means 7. In this case, pictures are skipped by a fixed number of skipped pictures in the picture interval G and displayed. FIGS. 16A and 16B are examples in which G=14, and the number n of skipped pictures from a picture i to a picture i+14 is determined by the motion vector MVi-1 in the previous pictures.

Incidentally, the present invention is not limited to the above described embodiments and may take variations, and it is to be understood that these variations are included in the present invention without departing from the present invention.

In accordance with the present invention, since the playback speed of pictures can be determined according to the motion vector of pictures, there is not a problem that the movement of pictures is so fast that it is difficult to keep track of the contents of pictures, or the playback is redundant in pictures having little movement, as in the conventional fixed fast playback, and the playback speed decreases for fast moving pictures and increases for slow movement. As a result, there is an effect that, even for fast playback pictures, the contents of pictures can be efficiently grasped.

Actually, for pictures compressed by MPEG 1, an evaluation was performed for the pictures which were replayed at a speed five times the normal speed both in the conventional fixed fast playback and in the fast playback of the present invention. As a result, it was verified that, in a scene such as a car chase the movement of which was too fast in the conventional playback to keep track of the contents, the playback was not too fast and it was easy to keep track of the contents in the present invention.

What is claimed is:

1. A fast video browsing system for motion pictures in which by displaying the input pictures after the skipped input pictures on a display, the playback is performed faster than the normal playback to enable the contents of the pictures to be easily kept track of, comprising:

an input means for inputting motion picture data stored in a storage device at a speed higher than the normal playback;

a motion amount detecting means for detecting the motion amount of an input picture inputted to said input means;

a number of skipped pictures determining means for determining the number of skipped pictures from the motion amount of said input picture detected by said motion amount detecting means; and a display means for continuously displaying with a frame timing only the pictures after those skipped by the number of skipped pictures determined by said number of skipped pictures determining means, thereby to enable the playback and browsing to be performed faster than the normal playback.

2. A fast video browsing system as set forth in claim 1 wherein said means for detecting the motion vector of a motion picture in the input scene uses any one of a single or plurality of pictures existing before and after with respect to time to determine the motion vector of the motion picture in said input scene.

3. A fast video browsing system as set forth in claim 1 wherein said means for detecting the motion vector of a motion picture in the input scene uses both a single or plurality of pictures existing before and after with respect to time to determine the motion vector of the motion picture in said input scene.

4. A fast video browsing system as set forth in claim 1 wherein said means for detecting the motion vector of a motion picture in the input scene determines the movement of a certain area R in the scene as the motion vector of the motion picture in said input scene.

5. A fast video browsing system as set forth in claim 1 wherein said means for detecting the motion vector of a motion picture in the input scene uses the respective motions of a plurality of small areas r in the scene to determine the motion vector of the motion picture in said input scene.

6. A fast video browsing system as set forth in claim 5 wherein said means for detecting the motion vector of a motion picture in the input scene determines the motion vector of the motion picture in said input scene by the picture average of the norms of motion in said respective small areas.

7. A fast video browsing system as set forth in claim 5 wherein said means for detecting the motion vector of a motion picture in the input scene determines the motion vector of the motion picture in said input scene by the norm of the picture average of the motions in each of the x- and y-directions in the respective small areas.

8. A fast video browsing system as set forth in claim 5 wherein said means for detecting the motion vector of a motion picture in the input scene deems the motion vector giving the maximum frequency in the motion vector distribution as the motion vector of the motion picture in said input scene.

9. A fast video browsing system as set forth in claim 1 wherein said means for determining the number of skipped pictures by the motion vector of said motion picture determines said number of skipped pictures so that the motion vector of the motion picture for the skipped motion pictures becomes a constant value.

10. A fast video browsing system as set forth in claim 9 wherein said constant value is decided according to the playback speed.

11. A fast browsing system for motion pictures set forth in claim 1,
wherein said motion amount detecting means detects the motion amounts of the motion pictures in a plurality of scenes which are in the past with respect to time, and averages said plurality of detected motion amounts.

12. A fast video browsing system for motion pictures in which by displaying the input pictures after the skipped input pictures on a display, the playback is performed faster than the normal playback to enable the contents of the pictures to easily be kept track of, comprising:

an input means for inputting the motion picture compressively coding information stored in a storage device at a speed higher than the normal playback;

a motion vector information extracting means for extracting motion vector information from the motion picture compressively coding information inputted to said input means;

a motion amount determining means for determining the motion amount of a motion picture in a scene by using the motion vector extracted by said motion vector information extracting means;

a number of skipped pictures determining means for determining the number of skipped pictures based on the motion amount of said motion picture; and a display means for continuously displaying with a frame timing only the pictures after those skipped by the number of skipped pictures determined by said number of skipped pictures determining means, thereby to enable the playback and browsing to be performed faster than the normal playback.

13. A fast video browsing system as set forth in claim 12 wherein said means for determining the motion vector of a motion picture in a scene uses any one of the motion vector information extracted from single or plurality of coded video information existing before and after with respect to time, thereby to determine the motion vector of the motion picture in said scene.

14. A fast video browsing system as set forth in claim 12 wherein said means for determining the motion vector of a motion picture in a scene uses both of the motion vector information extracted from the single or plurality of coded video information to determine the motion vector of the motion picture in said scene.

15. A fast video browsing system as set forth in claim 12 wherein said means for determining the number of skipped pictures according to the motion vector of the motion picture determines said number of skipped pictures so that the motion vectors of the motion pictures for the skipped pictures become a constant value.

16. A fast video browsing system as set forth in claim 15 wherein said constant value is determined according to the playback speed.

* * * * *

UNITED STATES PATENT AND TRADEMARK OFFICE
CERTIFICATE OF CORRRECTION

PATENT NO. : 5,754,728
DATED : May 19, 1998
INVENTOR(S) : Nakajima, et al Page 1 of 2

It is certified that error appears in the above-identified patent and that said Letters Patent is hereby corrected as shown below:

On the title page, in item [56] References Cited, insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 5 | 8 | 3 | 7 | 9 | 1 | 12/10/96 | Harigaya et al. | | | |
| | | | | | | | | | | | | | |

UNITED STATES PATENT AND TRADEMARK OFFICE
CERTIFICATE OF CORRRECTION

PATENT NO. : 5,754,728
DATED : May 19, 1998
INVENTOR(S) : Nakajima, et al It is certified that error appears in the above-identified patent and that said Letters Patent is hereby corrected as shown below:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | EP | 0 | 66 | 4 | 65 | 0 | A1 | 7/26/95 | Europe | | | | |

Signed and Sealed this

Thirteenth Day of April, 1999

Attest:

Q. TODD DICKINSON

*Attesting Officer*    *Acting Commissioner of Patents and Trademarks*